United States Patent

[11] 3,629,034

[72] Inventor Minoru Kuroda
 Amagasaki, Japan
[21] Appl. No. 8,103
[22] Filed Jan. 20, 1970
[45] Patented Dec. 21, 1971
[73] Assignees Nishizawa Shoji Co., Ltd
 Osaka, Japan;
 Pilgrim Industries, Inc.
 New York, N.Y.
[32] Priorities Dec. 19, 1966
[33] Japan
[31] 41/115532;
 Dec. 19, 1966, Japan, No. 41/115533; Dec. 19, 1966, Japan, No. 41/115535; Dec. 19, 1966, Japan, No. 41/83085
 Original application Jan. 21, 1969, Ser. No. 792,719, Continuation-in-part of application Ser. No. 662,962, Aug. 24, 1967. Divided and this application Jan. 20, 1970, Ser. No. 8,103

[54] METHOD OF MAKING AN ADHESIVE APPLIQUE ARTICLE
 8 Claims, 7 Drawing Figs.
[52] U.S. Cl. ............................................. 156/219,
 156/209, 156/228, 156/247, 156/251, 156/268, 156/553, 156/581, 161/40, 161/DIG. 3
[51] Int. Cl. ................................................B32b 31/12, B32b 31/20
[50] Field of Search .......................................... 156/79,
 219, 220, 228, 247, 251, 268, 581, 380, 212; 161/40, DIG. 3

[56] References Cited
UNITED STATES PATENTS

| 2,521,985 | 9/1950 | Lang et al. | 156/581 |
| 2,621,432 | 12/1952 | Willner | 161/DIG. 3 |
| 2,710,046 | 6/1955 | Markus et al. | 161/40 |
| 2,749,640 | 6/1956 | Scott | 161/28 X |
| 3,010,866 | 11/1961 | Douchet | 156/219 |
| 3,075,862 | 1/1963 | Hoyer | 156/219 X |
| 3,144,372 | 8/1964 | Peterson et al. | 156/251 |
| 3,219,506 | 11/1965 | Dunsina, Jr. et al. | 161/DIG. 3 |
| 3,244,573 | 4/1966 | Raffaelli, Sr. | 156/515 X |
| 3,265,551 | 8/1966 | Ananian et al. | 156/219 |
| 3,520,754 | 7/1970 | Scholl et al. | 156/212 X |

FOREIGN PATENTS

| 937,755 | 9/1963 | Great Britain | 156/251 |
| 950,262 | 2/1964 | Great Britain | 156/219 |
| 1,018,841 | 2/1966 | Great Britain | 156/219 |
| 1,120,103 | 7/1968 | Great Britain | 156/251 |

Primary Examiner—Carl D. Quarforth
Assistant Examiner—Roger S. Gaither
Attorney—Michael S. Striker ABSTRACT: A method of making adhesive applique article wherein one surface of a base layer of sheet material is provided with an adhesive backing a filler layer of resiliently compressible padding material, advantageously but not necessarily a layer of synthetic plastic foam material is interposed between the other surface of one one layer and a cover layer of sheet material. At least these layers are severed along a borderline which is inwardly spaced from their edges and coincides with the outline of the finished applique article, and selected portions of the top and base layers are bonded to one another within the confines of the borderline across the corresponding interposed portions of the foam layer while the selected portions are simultaneously pressed together with concomitant reduction in the thickness of the interposed portions of the foam layer. The remaining portions of the cover layer thus constitute at the exposed side of the latter a raised resilient design filled with the remaining portions of the foam layer and the result is a three-dimensional applique article which can be adhesively affixed to any desired surface.

INVENTOR
MINORU KURODA

PATENTED DEC 21 1971 3,629,034

INVENTOR
MINORU KURODA

METHOD OF MAKING AN ADHESIVE APPLIQUE ARTICLE

CROSS-REFERENCE TO RELATED APPLICATION

A related application was filed on Aug. 24, 1967 and is copending under Ser. No. 662,962; it is entitled "Method and Apparatus for Forming Applique Designs."

BACKGROUND OF THE INVENTION

The present invention relates generally to a method of making applique articles, and more particularly to a method of making adhesive applique articles which may be self-adhesively affixed to desired carriers or surfaces.

Applique articles made by means of embroidery or similar methods are already known, as are adhesive emblems or patches which are of the so-called self-adhesive type and ready to affixed to desired carriers. What to my knowledge is not known, however, are three-dimensional applique articles wherein part of a desired design is in relief as a result of padding with resiliently compressible filler material—as disclosed in my aforementioned copending application to which reference may be made, and which applique articles are self-adhesive as sought to be obtained by the present invention and may be affixed to any desired support or surface in the manner of adhesive patches or plaques.

SUMMARY OF THE INVENTION

It is an object of my invention to provide a method of making such padded three-dimensional adhesive applique articles.

A more specific object of my invention is to provide a method of making such applique articles which are self-adhesive and may be affixed to any desired surface in a most simple and speedy manner.

Additional abject of the present invention is to provide a method of making applique articles of the type under discussion which are of exceptionally pleasing appearance and may find use in an exceedingly wide variety of different applications.

Pursuant to the above objects, and others which will become apparent hereafter, one feature of my invention resides in providing a method of making adhesive applique articles of the type in question. My method comprises the provision of an adhesive backing on one surface of a base layer of sheet material and the interposition of a filler layer of resiliently compressible padding material, such as a layer of open-celled or closed-celled synthetic plastic foam material, between a cover layer of sheet material and the other surface of the base layer. Thereupon, at least the layers are severed along a borderline which is inwardly spaced from the edges of the layers and which is coincident with the outline of the finished applique article. Finally, I simultaneously bond selected portions of the top and base layers to one another within the confines of the aforementioned borderline and across the corresponding interposed portions of the filler layer while pressing the selected portions together with concomitant reduction in the thickness of the interposed portions of the filler layer, and thereby the remaining portions of the cover layer constitute at the exposed side of the latter a raised resilient design which is filled with the remaining portions of the padding layer. I thus obtain a resilient padded three-dimensional applique article which is ready to be adhesively affixed to any desired surface.

If I use a foam material it is advantageously a thermoplastic foam and the bonding of the selected portions of the top and base layers to one another involves the application of heat which serves to melt the interposed portions of the foam layer whereby the selected portions of the top and base layers become bonded to these interposed portions. Of course, the melting of these interposed portions results in simultaneous reduction of their thickness.

However, other materials are also suitable for the padding layer. Thus, natural or synthetic fibrous layers, for instance consisting of Dynel(TM) can also be used as long as they are of resiliently compressible nature.

A great variety of different materials may be used for the base and cover layers. For instance, both the cover and the base layer may consist of synthetic plastic material, such as thermoplastic material, or only one of them may consist of such material and the other may consist of a textile material, or again both the cover layer and the base layer may consist of textile material. Among the synthetic plastic materials suitable for the cover layer and/or the base layer is vinyl which is particularly advantageous, but which is by no means the only synthetic plastic material suitable for the purposes of the present invention.

The variety of possible designs or configurations for the adhesive applique article according to the novel method is of course almost unlimited. Clearly, pictorial representations may be provided on such an article, numerals, letters, symbols, emblems, and the like. Also, the "design" on the applique article, which term hereafter will be used broadly to designate both the characteristic appearance provided on the article by the raised and/or depressed portions as well as by any printing, coloring or the like provided on the cover or any other layer, may vary widely.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
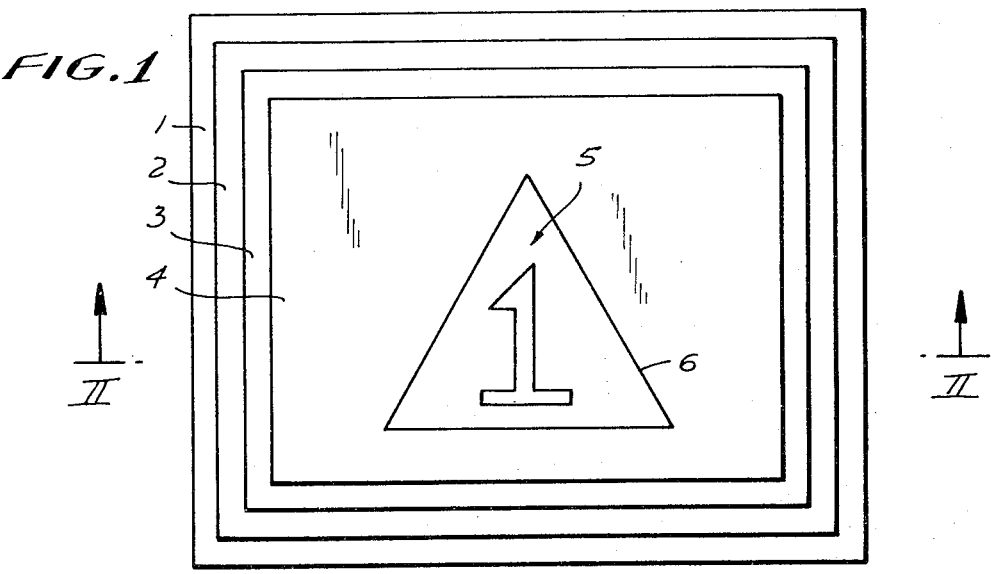
FIG. 1 is a plan view showing the various layers required for producing an adhesive applique article in accordance with one embodiment of my method, the illustration being of the layers prior to adhering of the layers together.
Figure 2:
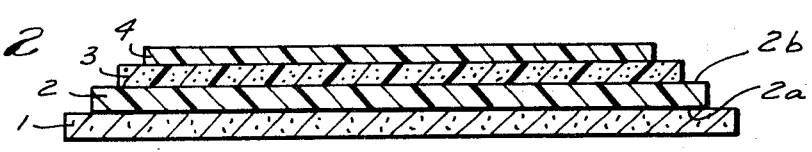
FIG. 2 is a section taken on the line II—II of FIG. 1.

Referring firstly to FIGS. 1 and 2 of the drawing is will be seen that I have shown four different layers superimposed upon one another. To increase the clarity of illustration the layers, identified with reference numerals 1, 2, 3 and 4, are shown as being of different sizes. In actual fact it will, however, usually be advantageous if the layers are coextensive or substantially coextensive although this is a matter of convenience and does not affect the present invention.

Reference numeral 4 in the illustrated embodiment identifies a cover layer of sheet material which may be synthetic plastic material but could also for instance be a textile material or the like. For purposes of the present description it will be assumed that the layer 4 is of synthetic plastic material. In the illustrated embodiment the layer 4 has imprinted on its exposed surface a pictorial representation of the applique article which it is desired to obtain. It will be seen that this representation is generally identified with reference numeral 5 and comprises the outline of the numeral one located in a triangular patch whose borderlines are identified with reference numeral 6. In other words, the adhesive applique article which it is intended to produce is to be of triangular shape and to be provided with the numeral one.

The outline 6 and the numeral 1 may be embossed into the layer 4, be printed, painted or otherwise applied onto the exposed surface of the layer 4 or, if the latter should be transparent or translucent, even on its concealed surface, be partly provided on the exposed and partly on the concealed surface if the layer 4 consists of transparent or translucent material, or they may be provided in any other suitable manner whatsoever.

The layer 4 is superimposed upon a layer 3 of padding material, here shown as consisting of synthetic plastic foam material, advantageously a thermoplastic foam. The layer 3 in turn is superimposed upon a base layer 2 of sheet material which analogously to the layer 4 may consist of different materials but for purposes of the present description is assumed to be a synthetic plastic material. The underface of the layer 2 is provided with an adhesive backing 2a, for instance simply in form of a coating of adhesive material 2a applied onto this undersurface. It is readily evident that a great variety of adhesives will be suitable for the purposes at hand. Thus, there are latent adhesives which must in some way be activated, and there are active adhesives which are constantly in activated state. A detailed description of these adhesives is not believed necessary because they are very well known to those skilled in the art. It is evident, however, that if the layer or coating 2a consists of an active adhesive, it must be protected until the time of use of the applique article. Therefore, FIGS. 1 and 2 show a layer 1 of so-called "release paper" applied over the coating 2a. The term "release paper" is conventional in this field and is not necessarily limited to a layer of paper but rather identifies a material which so adheres to the coating 2a of adhesive material as to protect the coating but can be readily peeled off without damaging the coating 2a, thereby exposing the latter and readying it for application of the applique article to a desired surface.

Figure 3:
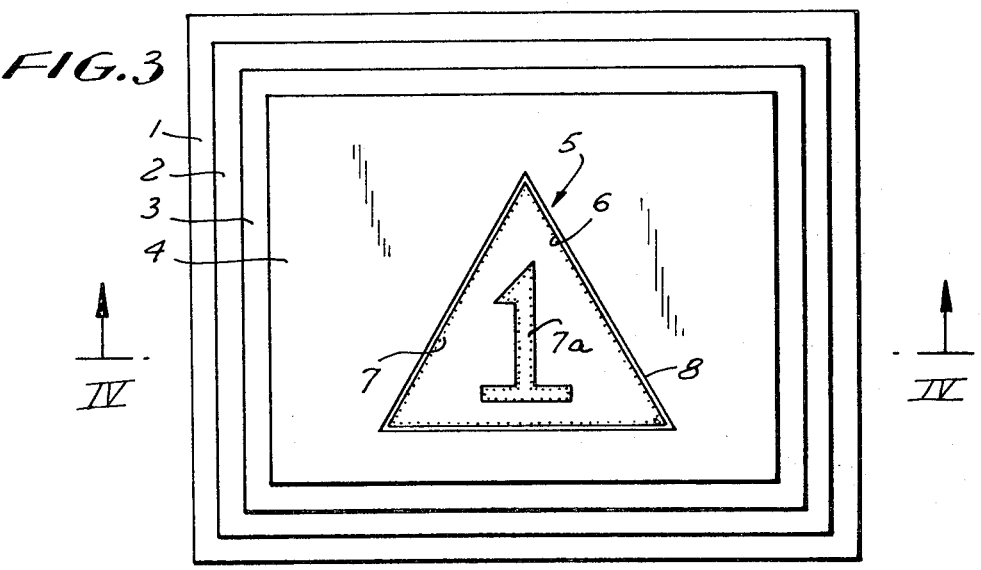
FIG. 3 is similar to FIG. 1 but illustrates the layers after they have been adhered together.
Figure 4:
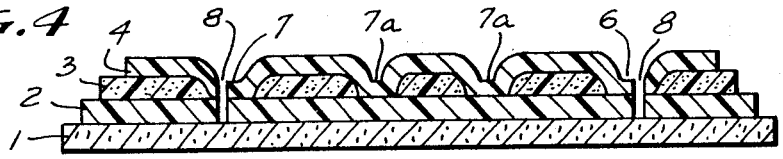
FIG. 4 is a section taken on the line IV—IV of FIG. 3.

Coming now to FIGS. 3 and 4 it is pointed out that therein I have illustrated the next-following steps in the conversion of the multilayer blank of FIGS. 1 and 2 into an adhesive applique article according to the present invention. The same reference numerals as in FIGS. 1 and 2 apply also in FIGS. 3 and 4. However, in FIGS. 3 and 4 I have shown that the layers 2, 3 and 4 have been severed along a borderline or outer contour line 8 which is inwardly spaced from the edges of the layers 2, 3 and 4 and which, in the illustrated embodiment, extends along the design outline 6 just outwardly adjacent thereto. Evidently the borderline 8, which may also be thought of as the severing line, could also be directly coincident with the outline 6 or be located inwardly thereof. In the illustrated embodiment it is assumed that in the finished applique article it is desired to have the outline 6—which may be printed or otherwise applied—be visible.

In addition to severing of the layers 2, 3 and 4 along the severing line 8 (compare FIG. 4) selected portions of the cover layer 4 have also been bonded to corresponding portions of the base layer 2 across the corresponding interposed portions of the foam layer 3. In FIGS. 3 and 4 these selected portions are in form of a narrow outer bonding zone 7 located inwardly and extending along the outline 6, as well as inner bonding zone 7a located inwardly and extending along the outline of the numeral one. This bonding is accomplished by pressing the selected portions (zones 7 and 7a) of the layers 4 and 2 together and thereby reducing the thickness of the interposed foam layer 3, or more particularly of the interposed portions of the foam layer 3, and effecting the requisite bonding. The foam layer 3 may, as pointed out before, consist of thermoplastic foam material and can thus be thought of as a latently adhesive material which will effect bonding of the layers 4 and 2 at the aforementioned zones 7 and 7a if subjected to sufficiently elevated temperature for the foam material of the layer 3 to become activated, that is to enter into a bond with the material of the layers 2 and 4. The pressure and application of elevated temperatures result in melting of the foam of the layer 3 along the zones 7 and 7a and the foam thus bonds the layers 2 and 4 together. It will be appreciated that if the one or both of the layers 2 and 4 consist of a textile material the melted foam will partly penetrate into the interstices in such material whereas, if one or both of the layers 2 and 4 consist of synthetic plastic material, the material of these layers 2 and 4 may itself partly melt and bond with the material of the layer 3.

In any case, the resultant cross-sectional configuration illustrated in FIG. 4 shows that the applique article 5 is surrounded by the severed remaining portions of the layers 2, 3 and 4 and comprises depressed zones 7 and 7a and raised zones between these depressed zones, so that the article 5 constitutes a foam-filled resilient three-dimensional applique article on which the numeral one is outlined by the zone 7a.

Figure 5:
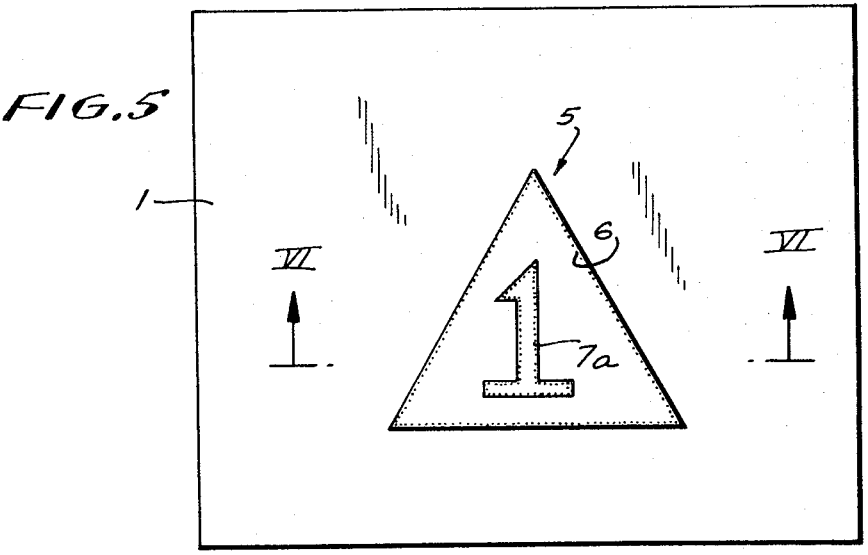
FIG. 5 is a plan view of FIG. 3, but with the excess material of the layers removed and only the applique article remaining on its release paper.
Figure 6:
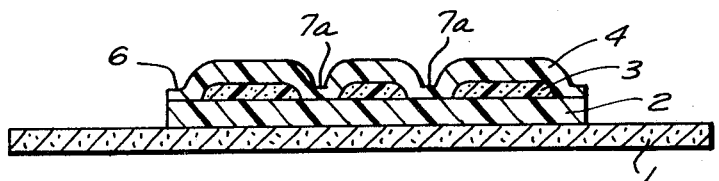
FIG. 6 is a section taken on the line VI—VI of FIG. 5.

FIG. 4 shows that in the exemplary embodiment illustrated the release paper or release layer 1 has not been severed along the severing line 8 so that the applique article remains, as shown in FIG. 5, adhesively attached to its release layer or release paper 1 which latter retains its original dimensions. FIG. 6, a section on the line VI—VI of FIG. 5, shows this quite clearly. It will be appreciated, of course, that it is possible to sever the release layer 1 at the same time as the layers 2, 3 and 4 are severed, and also along the severing line 8. However, it is generally desirable to take the approach shown in FIGS. 5 and 6 because, when the release paper 1 projects laterally beyond the applique article 5, it can be more readily peeled off by bending it away from the underside of the applique article.

Figure 7:
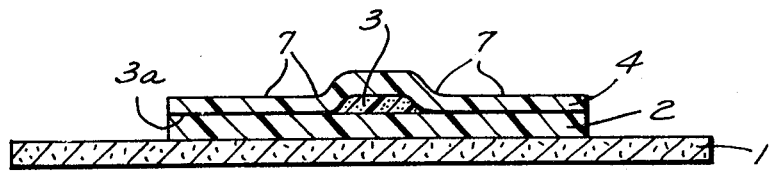
FIG. 7 is a view similar to FIG. 6 but illustrating another embodiment of the invention.

The embodiment illustrated in FIG. 7 is somewhat different from the preceding embodiment. FIG. 7 is a section analogous to the one shown in FIG. 6. The layers are again identified with the same reference numerals as in the preceding figures. However, in the embodiment of FIG. 7 it is assumed that the numeral one is to appear raised whereas the remainder of the applique article is to be depressed below the level of numeral one. Accordingly, the areas 7 in which selected portions of the layers 2 and 4 are bonded together are considerably larger then the narrow zones identified with reference numeral 7 in the preceding Figures and include the entire surface area of the layer 4 with the exception of the raised surface portion of the layer 4 corresponding to the configuration of numeral one. Reference numeral 3a in FIG. 7 shows how the portions of the layer 3 which are intermediate the thus bonded portions of the layers 2 and 4, have been compressed and melted to provide the desired bonding, whereas the remainder of the foam layer 3, that is the portion thereof which is interposed between the nonbonded portions of the layers 2 and 4, retains its original thickness and thus constitutes padding for the raised three-dimensional numeral one which is, accordingly, foam filled as visible in FIG. 7.

In FIGS. 1-7 the configuration and the design of the novel applique article have been shown on hand of a very simple example. It is evident that this is not to be considered limiting and that not only numerals, but also lettering, symbols or entire pictorial representations of flowers, animals, inanimate objects and, in fact, of anything which can be pictorially represented, may be similarly provided on the novel adhesive applique article. Any selected portions of such designs may be provided either raised or depressed, as desired.

The wide range of applicability of my novel invention is obvious and requires no elaboration. By way of example it need merely be suggested that adhesive applique articles made according to the present method may be provided in form of "stick-on" patches for garments, in form of adhesive signs or adhesive advertising stickers, in form of decorative panels to be affixed to furniture or the like, as wallpaper having foam-filled, resilient three-dimensional characteristics, and in any other of an exceedingly great variety of applications which will offer themselves to those conversant with the art.

Also, while certain materials have been mentioned as suitable by way of example, it should be clearly understood that many other materials can also be used, just as a variety of different effects may be produced if, for instance, the cover layer 4 is translucent or transparent, and if different types of colors, inks or the like are used to provide a design either on the exposed face of the layer 4, the concealed face of this layer, partly on one and partly on the other of these faces, partly on the layer 4 and partly on the exposed face of the layer 3, and the like. All of this is mentioned to suggest the great versatility of the present invention.

It will be understood that each of the elements described above, or two or more together, may also find a use in other types of applications differing from the types described above.

While the invention has been illustrated and described as embodied in a method of making an adhesive applique article, it is not intended to be limited to the details shown, since various modifications and structural changes can be made without departing in any way from the spirit of the present invention.

I claim:

1. A method of making an adhesive applique article, comprising the steps of providing a base layer of sheet material; providing an adhesive backing on only one surface of said base layer; providing a release layer; providing a cover layer of sheet material having a design surface with an outer contour line, a narrow outer bonding zone along said outer contour line and at least one inner bonding zone spaced inwardly from said outer bonding zone; further providing an intermediate layer of resiliently compressible latently adhesive material having spaces filled with a gaseous medium; forming a sandwich composed of said release layer, said base layer superimposed on said release layer with said adhesive backing thereof in contact with said release layer; said intermediate layer superimposed with one surface thereof on the other surface of said base layer and said cover layer superimposed on the other surface of said intermediate layer; and pressing said cover layer within said outer and inner bonding zones against said intermediate layer and said base layer while activating only said latently adhesive material and thereby bonding said cover layer by said latently adhesive material to said other surface of said base layer in said outer and inner bonding zones, and severing said cover layer, intermediate layer and base layer together with said adhesive backing along said outer contour line, the presence of said intermediate layer resulting in formation of a cushion between said base layer and said cover layer in the area surrounded by said outer bonding zone upon bonding of said cover layer to said base layer.

2. A method as defined in claim 1, wherein said material of said intermediate layer is a thermoplastic cellular material; and wherein the step of bonding said cover layer to said base layer comprises subjecting said intermediate layer to the influence of elevated temperature within said inner and outer bonding zones so as to effect at least partial melting of said intermediate layer in said zones with concomitant collapse of the cell structure of said cellular material in said zones.

3. A method as defined in claim 1, wherein said base layer is a textile material having interstices, and wherein said material of said intermediate layer is a thermoplastic material; the step of activating said latently adhesive material comprising subjecting said intermediate layer to elevated temperature in said inner and outer bonding zones for effecting at least partial melting of said intermediate layer in said zones and penetration of said thermoplastic material into said interstices of said textile material of said base layer.

4. A method as defined in claim 1, wherein the step of providing said adhesive backing comprises coating said one surface of said base layer with a latently adhesive agent.

5. A method as defined in claim 1, wherein the step of providing said adhesive backing comprises coating said one surface with an actively adhesive agent.

6. A method as defined in claim 1, wherein said material of said intermediate layer is a thermoplastic fibrous sliver.

7. A method as defined in claim 1, wherein said material of said intermediate layer is an open-celled synthetic plastic foam material.

8. A method as defined in claim 1, wherein said material of said intermediate layer is a closed-celled synthetic plastic foam material.

* * * * *